United States Patent [19]

Nancarrow et al.

[11] Patent Number: 4,969,332
[45] Date of Patent: Nov. 13, 1990

[54] CONTROLLER FOR A THREE-WHEEL TURBOCHARGER

[75] Inventors: James H. Nancarrow, Mission Viejo; Fredrick E. Burdette, Torrance; George A. Adeff, Los Angeles, all of Calif.

[73] Assignee: Allied-Signal, Inc., Torrance, Calif.

[21] Appl. No.: 303,448

[22] Filed: Jan. 27, 1989

[51] Int. Cl.$^5$ ............................................. F02B 37/10
[52] U.S. Cl. .................................................... 60/608
[58] Field of Search ................... 60/607, 608; 123/325, 123/332, 493, 529

[56] References Cited

U.S. PATENT DOCUMENTS

| | | | |
|---|---|---|---|
| 2,957,463 | 10/1960 | Schnabel | 123/332 |
| 2,968,914 | 1/1961 | Birmann | 60/628 |
| 3,805,754 | 4/1974 | SoHau | 123/332 |
| 4,285,200 | 8/1981 | Byrne et al. | 60/607 |
| 4,322,949 | 4/1982 | Byrne et al. | 60/606 |
| 4,444,014 | 4/1984 | Kobayashi et al. | 60/608 |
| 4,478,043 | 10/1984 | Kobayashi et al. | 60/608 |
| 4,572,125 | 2/1986 | Kratt | 123/325 |
| 4,622,817 | 11/1986 | Kobayashi | 60/608 |
| 4,803,969 | 2/1989 | Hiereth et al. | 60/608 X |

FOREIGN PATENT DOCUMENTS

| | | | |
|---|---|---|---|
| 3008181 | 9/1981 | Fed. Rep. of Germany | 60/608 |
| 10114 | 1/1983 | Japan | 60/608 |

Primary Examiner—Michael Koczo
Attorney, Agent, or Firm—Poms, Smith, Lande & Rose

[57] ABSTRACT

A controller for a three-wheel turbocharger is shown for receiving input parameters including: throttle or rack position, manifold absolute pressure, airflow (either mass or volume), and engine RPM. The controller may also use an accumulator. The operating parameters are used by the controller to control the amount of hydraulic fluid applied to the third hydraulic turbine wheel of the turbocharger through various operational modes including: pump bypass, power transfer, lugging or override, and accumulator charging modes. The controller is designed so that power transfer may be overridden when engine load sensed by manifold absolute pressure or airflow or throttle position is reduced.

29 Claims, 5 Drawing Sheets

CONTROLLER FOR A THREE-WHEEL TURBOCHARGER

BACKGROUND OF THE INVENTION

1. Field of the Invention

The present invention relates a controller for a three-wheel turbocharger and, more particularly, to an improved controller which utilizes identified engine parameters to control the flow of engine oil or turbocharger hydraulic fluid to the third turbine wheel on a turbocharger which, in turn, maintains a minimum absolute pressure within an engine manifold under all dictated conditions.

2. Discussion of the Prior Art

A turbocharger having a third wheel for supplementing the energy provided to turn the turbocharger during engine operation when additional airflow is required is shown in U.S. Pat. No. 4,285,200, which issued Aug. 25, 1981, by J. L. Byrne et al., which is assigned to the Garrett Corporation. This patent discloses a control valve which is controlled by the compressor discharge pressure.

In a later filed continuation-in-part of the above-identified Byrne et al. patent, the use of an auxiliary combustor which is mounted between an engine and the turbocharger is disclosed. This combustor receives fuel from the engine fuel supply and air from a bypass between the turbocharger and the engine to provide a boost to the turbine wheel of the turbocharger during starting conditions. The patent also describes alternative methods for boosting the RPM of the turbocharger during starting conditions including a high pressure pump or a high pressure oil accumulator. See U.S. Pat. No. 4,322,949, which issued Apr. 6, 1982, by J. L. Byrne et al. assigned to the Garrett Corporation.

In U.S. Pat. No. 4,444,014, issued Apr. 24, 1984, by R. J. Kobayashi et al., assigned to the Garrett Corporation, there is disclosed a control arrangement which uses a dual function control valve responsive to engine speed and load to regulate the supply of hydraulic fluid to the third wheel of the turbocharger. The control valve is responsive to increasing hydraulic pressure which is proportional to engine speed. The control valve is driven by a diaphragm which adjusts the valve in proportion to the engine load utilizing the differential between the engine sump pressure and the pressure of the charge air on the output side of the turbocharger compressor.

U.S. Pat. No. 4,478,043, issued Oct. 23, 1984, by R. J. Kobayashi et al, assigned to the Garrett Corporation, is substantially similar to the U.S. Pat. No. 4,444,014 but includes method claims.

U.S. Pat. No. 4,622,817, issued Nov. 18, 1986, by R. J. Kobayashi, assigned to the Garrett Corporation, discloses a control circuitry similar to that shown in the two U.S. Pat. Nos. 4,444,014 and 4,478,043 mentioned immediately above. This later patent further discloses a pilot controller or solenoid operated valve which is controlled by an electrical master control unit that receives input signals including speed determined by a tachometer and pressure determined by the compressor discharge pressure.

SUMMARY OF THE INVENTION

It is an object of the present invention to provide an improved controller for a three-wheel turbine.

It is a further object of the present invention to establish engine control using operating parameters including accelerator position and engine load.

In accomplishing these and other objects there is provided a improved controller that utilizes a plurality of operating parameters including load as determined by the absolute pressure of the intake manifold, or engine airflow, accelerator position, and engine RPM. There is further provided an accumulator within the supply line that supplies hydraulic fluid to the non-vented third turbine wheel during the boost phase of the turbocharger operation. The controller may be either an electrical control system or a hydraulic control system.

DESCRIPTION OF THE DRAWINGS

A better understanding of the foregoing objects and of additional objects and advantages of the present invention will be had after consideration of the following specification and drawings, wherein.

DESCRIPTION OF THE PREFERRED EMBODIMENTS

Figure 1:
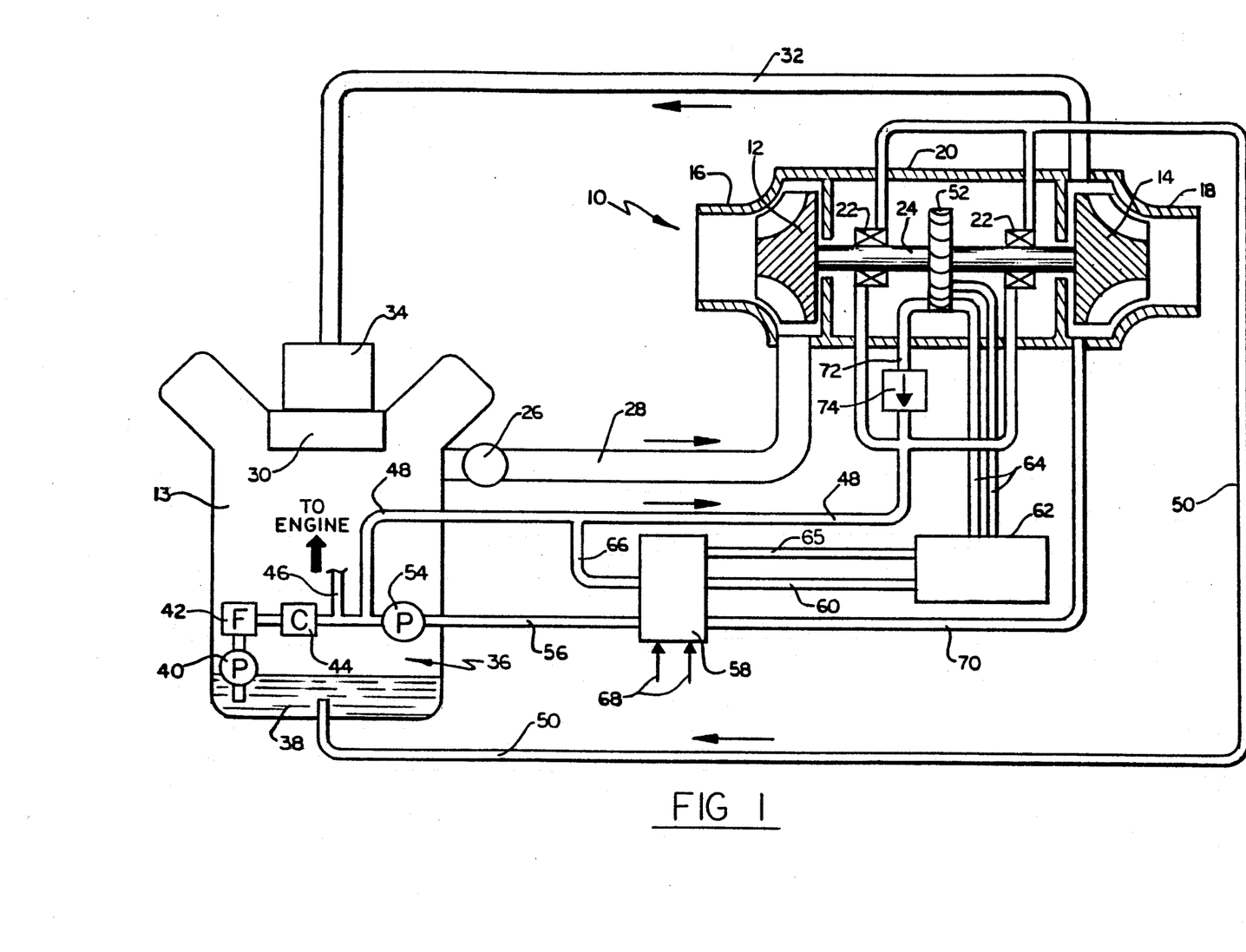
FIG. 1 is a schematic diagram illustrating a hydraulic three-wheel turbocharger which may be controlled by a controller of the present invention.

A three-wheel turbocharger 10 is shown in FIG. 1 for supplying relatively high density charge air to a combustion engine 13, such as a two-cycle or a four-cycle internal combustion engine which may be either gasoline or diesel fueled. This three-wheel turbocharger is described in greater detail in U.S. Pat. No. 4,285,200, issued Aug. 25, 1981, by J. L. Byrne et al.

The turbocharger 10 includes a turbine wheel 12 and a compressor wheel 14 received respectively within turbine and compressor housings 16 and 18. The turbine and compressor housings 16 and 18 are interconnected by a central housing 20 including bearings 22, such as suitable journal and thrust bearings, for rotatably supporting a shaft 24 to which the turbine wheel 12 and the compressor wheel !4 are connected.

The turbine wheel 12 is rotatably driven by exhaust gas from the engine 13 which is supplied to the turbine wheel by an exhaust manifold 26 and an exhaust conduit 28. The rotating turbine wheel 12 drives the shaft 24 and the compressor wheel 14, whereby the compressor wheel 14 draws in and compresses ambient air. This compressed ambient air comprises the charge or boost air for the engine 13 and is supplied to the intake manifold 30 of the engine 13 by a charge air conduit 32. If desired, a heat exchanger 34 may be placed in the conduit 32 to cool the charge air so as to reduce the heat load on the engine 13 and to further densify the charge air.

The engine 13 includes a hydraulic fluid system 36 which is connected to provide shared hydraulic fluid to the turbocharger 10 for lubricating the turbocharger bearings 22. In a preferred embodiment of the invention, the engine hydraulic fluid system 36 comprises a reservoir 38 for hydraulic fluid or oil within the engine, a relatively low pressure oil pump 40 for pumping oil from the reservoir 38 to the engine 13 and to the turbocharger 10. Pump 40 is connected to an oil filter 42 and then to a cooler 44 before being divided where the oil is supplied to the engine components as indicated by conduit 46. The oil is also coupled through a supply conduit 48 to the center housing 20 of the turbocharger 10 for supply to the turbocharger bearings 22 via a network of internal passages (not shown) formed in the center housing. The oil passes through the bearings 22, typically by a gravity-drain system, and is returned to the engine oil reservoir 38 by a return conduit 50. Accordingly, the bearings 22 of the turbocharger 10 share the hydraulic system 36 with the engine 13 to assure properly lubricated bearings at all times.

The turbocharger 10 includes a nonventilated hydraulic turbine wheel 52 for supplementally driving the turbocharger compressor wheel 14 during certain modes of engine operation. That is, during some conditions of engine operation, the engine exhaust gases are incapable of rotatably driving the turbine wheel 12 at a speed sufficient to drive the compressor wheel 14 to supply the engine 13 with sufficient charge air. For example, such engine operating conditions may include relatively low speed, full load conditions where the available energy in the exhaust gases is relatively low, or relatively low speed, acceleration conditions wherein there is insufficient excess charge air available to accommodate rapid transient operating conditions. To assure that the compressor wheel 14 is sufficiently driven to supply the engine with sufficient quantities of charge air, the turbocharger system includes the nonventilated hydraulic turbine wheel 52 for supplementally driving the compressor wheel 14.

As illustrated in FIG. the nonventilated hydraulic turbine wheel 52 is mounted within the center housing 20 directly upon the turbocharger shaft 24 between the sets of bearings 22 that rotatably support the shaft. The nonventilated hydraulic turbine 52 is hydraulically driven by high pressure fluid or oil shared from the engine hydraulic system 36 or a separate hydraulic system. That is, the hydraulic system 36 includes a high pressure pump 54 which may be suitably driven by the engine 13 to provide a source of high pressure fluid. As shown, the high pressure pump 54 has its intake coupled to the engine hydraulic system 36 conveniently at the discharge side of the low pressure pump 40. The high pressure pump 54 supplies high pressure oil through a high pressure supply conduit 56 coupled directly to a controller 58 which will be described hereinbelow in greater detail. The controller 58 operates to supply high pressure oil flow via a conduit 60 to a nozzle control valve 62 which will also be described in greater detail hereinbelow. In some embodiments, the high pressure oil may be supplied directly to the nozzles that drive the hydraulic turbine wheel 52 by the conduit line 60. In other embodiments, the controller 58 supplies high pressure oil through a plurality of conduits 64 from nozzle control valve 62 under the control of control line 65 to a plurality of nozzles that drive the third turbine wheel 52. When the controller 58 is not calling for high pressure oil to be supplied to the hydraulic turbine wheel 52, the oil is returned via a conduit 66 to the bearing supply conduit 48.

The controller 58 receives several inputs which represent the operating parameters of the engine 13 as indicated generally at 68. One of these operating parameters is the compressor discharge pressure provided via pressure control line 70. In the preferred embodiment, this compressor discharge pressure may be substantially the same as the absolute pressure at the input manifold 30 if the heat exchanger 34 is not used. When heat exchanger 34 is used, the pressure control line 70 should be connected to intake manifold 30. Other operating parameters within the preferred embodiment of this invention include accelerator position, i.e. throttle position when engine 13 is a gasoline engine or rack position when the engine is a diesel engine, and engine RPM.

Figure 3:
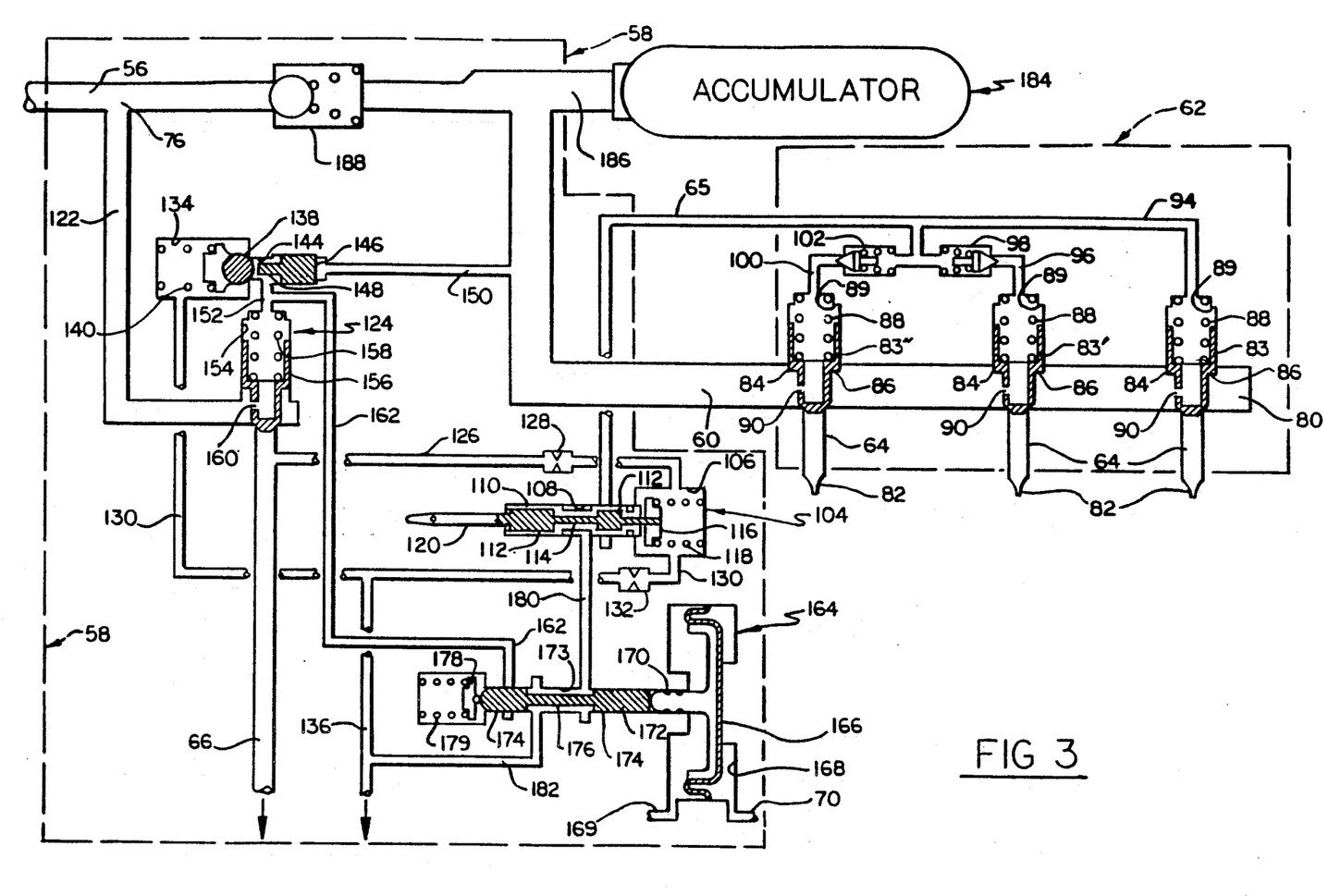
FIG. 3 is a schematic diagram, similar to FIG. 2, illustrating a second hydraulic control system.
Figure 4:
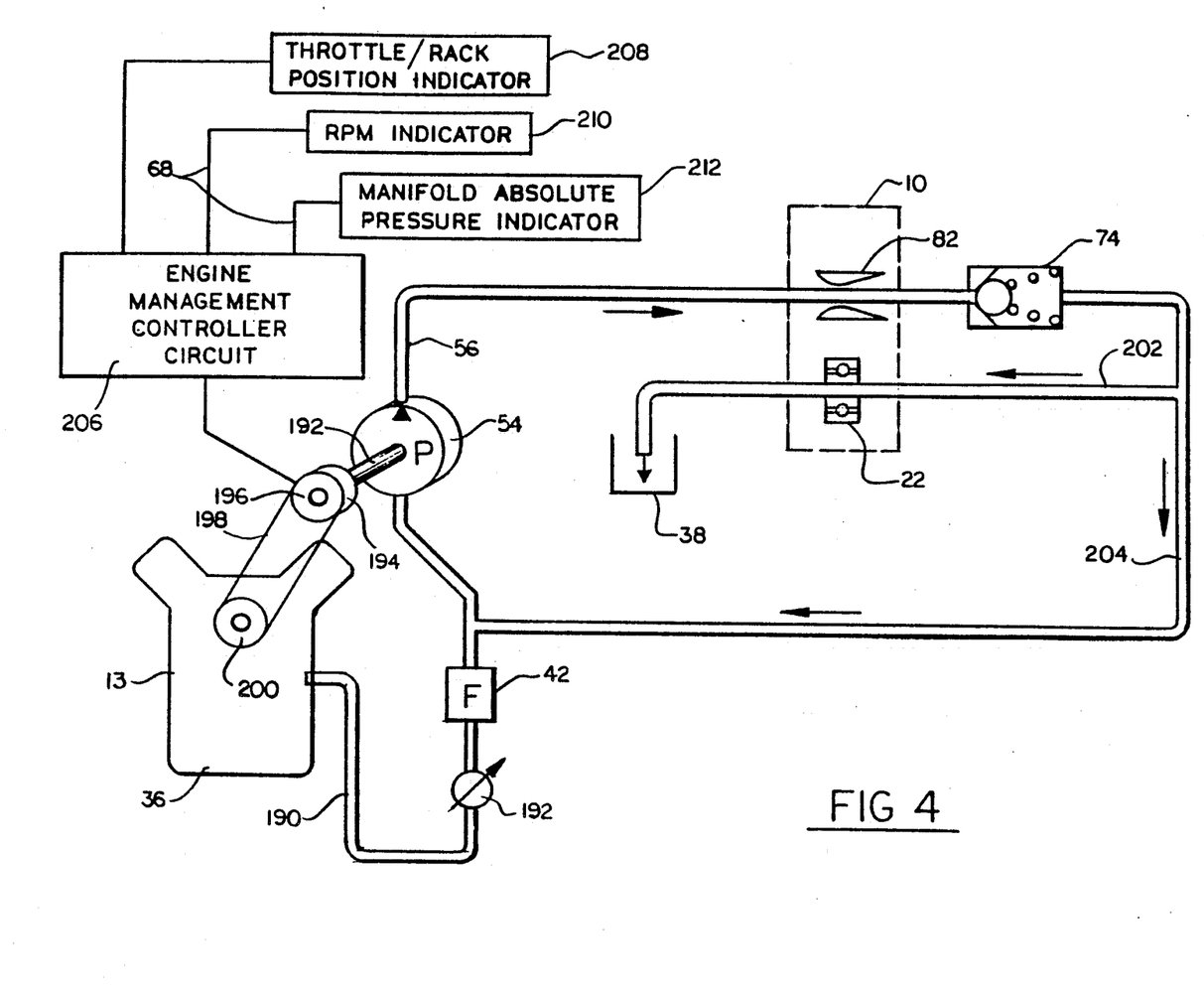
FIG. 4 is a schematic diagram illustrating an electrical control system.
Figure 5:
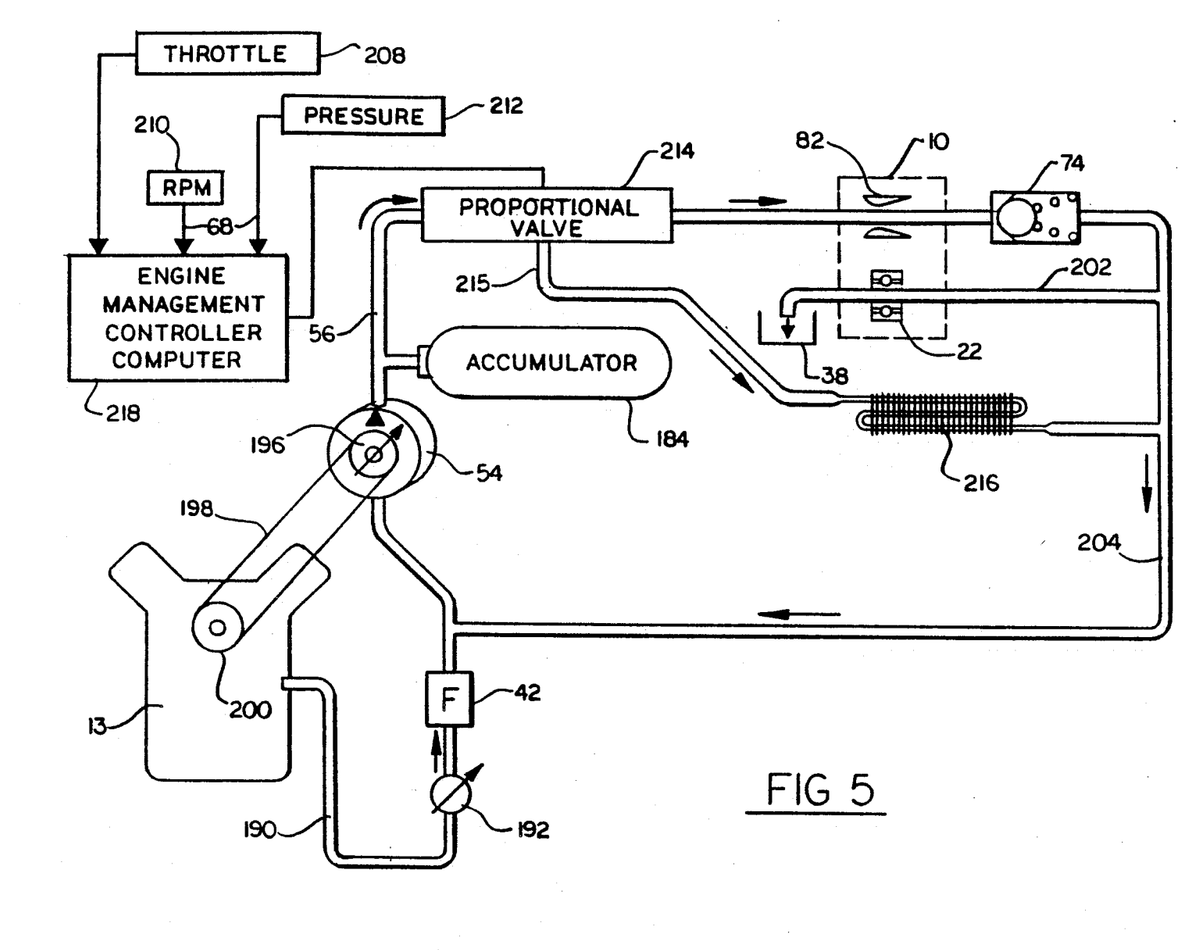
FIG. 5 is a diagram, similar to FIG. 4, showing another embodiment of an electrical control system.

After the high pressure oil passes through the hydraulic turbine wheel 52, it is returned via a return line 72 through a check valve 74 to the bearing oil supply line 48. The controller 58 described by the present invention is an improvement over the control valve described in U.S. Pat. No. 4,285,200 because it utilizes the plurality of operating parameters mentioned above to more efficiently maintain a minimum manifold absolute pressure under all dictated conditions. Further, the controller 58 may have either a hydraulic configuration, as shown in FIGS. 2 and 3, or an electronic configuration, as shown in FIGS. 4 and 5.

Figure 2:
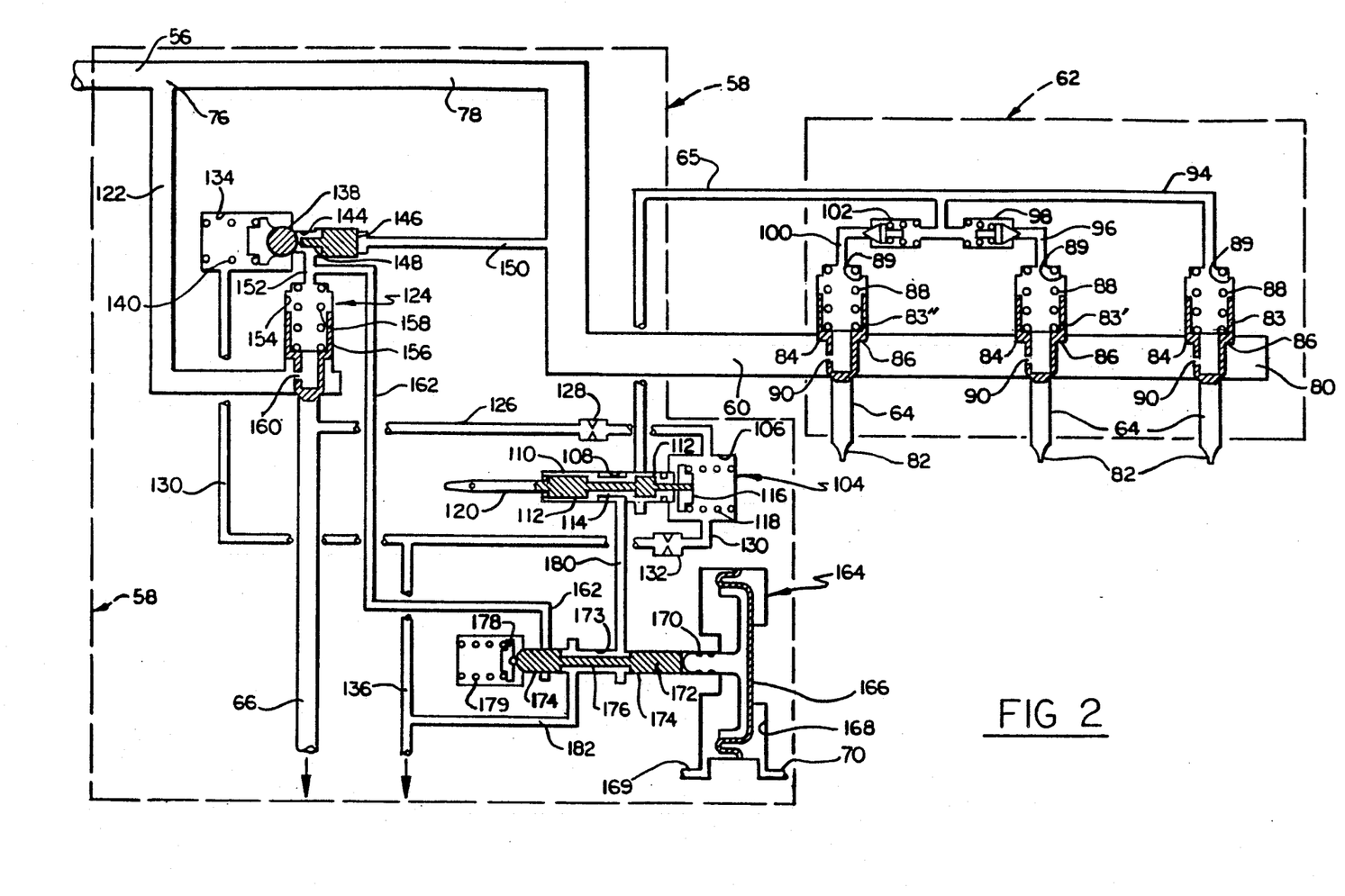
FIG. 2 is a schematic diagram illustrating a hydraulic control system.

Referring now to FIG. 2, the controller 58 in a hydraulic configuration is shown in greater detail wherein the high pressure oil conduit 56 divides at a T 76 into a supply conduit 78 which supplies a nozzle control valve manifold 80 which, in turn, is connected to the plurality of conduits 64 that supply a plurality of hydraulic turbine wheel nozzles, shown schematically at 82. Connecting each supply conduit 64 to the manifold 80 are a plurality of individual nozzle control valves 83, 83' and 83" which include a piston 84 disposed in each conduit 64 to close that conduit. Each piston 84 is formed with a shoulder 86 against which the high pressure oil in manifold 80 exerts an upward pressure to overcome the force of a spring 88 mounted within a piston cylinder 89 that urges the piston 84 in a downward direction. In the preferred embodiment, the oil pump 40 may produce an oil pressure of approximately 50 psi, for example, within the lubricating circuit. High pressure pump 54, in turn, produces a pressure of approximately 2000 psi, for example, in the hydraulic turbine circuit. The springs 88 in the plurality of cylinders 89 may be set to permit the opening of the valve pistons 84 at different pressures. For example, and without being intended as a limitation, the right-hand valve 83 in FIG. 2 can be designed to stay open at pressures above 100 psi and can be connected to a plurality of nozzles, such as three. The middle valve 83' may be designed to open after the high pressure oil in manifold 80 reaches 1200 psi, for example, and may supply oil to a second plurality of nozzles, three for example. The left-hand valve 88" may be designed to open at 1700 psi, for example and may provide high pressure hydraulic fluid to a plurality of nozzles, such as five. Thus an increasing oil pressure will open one, two and then three valves 83, 83' and 83" to supply high pressure oil to three, six and eleven nozzles 82, for example. Each set of nozzles may have a different angle relationship to turbine wheel 52 and a different orifice size for driving that wheel.

Each piston 84 is provided with at least one aperture 90 which permits the high pressure oil to bleed into the interior of the piston 84 until the pressure on either side of the piston 84 is substantially equal. As the surface area on the upper side of piston 84 is greater than or equal to the surface area of shoulder 86 and as there is an additional force exerted by the springs 88, the pistons 84 remain tightly closed. It will be seen that each piston cylinder 89 of valves 83, 83' and 83" is connected to the control line 65 with valve 83 connected directly by control line 94, valve 83' connected by a control line 96 through a check valve 98, and valve 83" connected by control line 100 and check valve 102. Check valve 98 is spring-loaded to open when the pressure within manifold 80 exceeds 1200 psi, for example, while check valve 102 opens when the pressure within manifold 80 exceeds 1700 psi, for example.

The control line 65 is connected to a rack position control valve 104 which includes a pressure chamber 106 and a cylinder 108 in which is mounted a valve piston 110. The piston 110 is provided with a pair of lands 112 which separate a relieved area 114. The right-hand end of the piston 110 is attached to a plunger 116 which is spring-loaded by a spring 118 within chamber 106 to urge the piston 110 to the left, as shown in FIG. 2. The piston 110 may be connected by a linkage 120 to the rack of a diesel engine or to the throttle of a gasoline engine.

The high pressure hydraulic fluid supply conduit 56 is connected at the T 76 by a bypass conduit 122 which connects to the input side of a pump bypass valve 124. The output side of the pump bypass valve 124 is connected to the return conduit 66 which returns the high pressure hydraulic fluid to the input side of the high pressure pump 54. Hydraulic fluid in this line is maintained at a lower pressure than the high pressure pump, for example, 50 psi. This 50 psi (for example) fluid is supplied by a conduit 126 through an orifice 128 to the pressure chamber 106 of the rack position control valve 104. A second conduit 130 is connected from chamber 106 through an orifice 132 to a pressure chamber 134 in bypass valve 124. Conduit 130 also connects via a conduit 136 to the crank case return conduit 50 to return the hydraulic fluid used for control signals to the hydraulic system 36.

It will be seen that the pump bypass valve 124 includes a check valve 138 which is spring-loaded within the pressure chamber 134 by a spring 140 to normally close an orifice opening into a plunger chamber 144 which slidably mounts a plunger 146 having a land surface that rides within the chamber 144 and an extending finger 148 which contacts the check valve 138.

The plunger 146 may be moved to the left by a pressure on its right-hand surface which is applied via conduit 150 from the nozzle control valve manifold 80. The plunger chamber 144, on the left-hand end of plunger 146, connects via a conduit 152 to a piston cylinder 154 that receives a piston 156 which forms the heart of bypass valve 124 by closing the bypass conduit 122 from return conduit 66 under the urging of a spring 158. Piston 156 is, like the pistons 84 in the individual nozzle control valve 83 of control valve 62 provided with an aperture 160 which permits the high pressure hydraulic fluid to bleed through the cylindrically shaped piston 156 for equalizing pressure on either side of the piston. As with the pistons 84, the piston 156 remains closed under the urging of spring 158. The high pressure hydraulic fluid which is permitted to bleed into chamber 154 through aperture 160 is applied via conduit 152 to the plunger chamber 144. This pressure is relieved by the check valve 138. The pressure can also be relieved by a drainage conduit 162 which communicates from conduit 152 to a boost limiter valve 164.

The boost limiter valve 164 includes a diaphragm 166 mounted within a chamber 168 having two inputs, one on either side of the diaphragm. The first input receives absolute pressure from the input manifold via pressure control line 70, mounted on the right-hand side of diaphragm 166, while the second input receives atmospheric pressure, for example, via line 169 on the left-hand side. The diaphragm 166 is connected by a rod assembly 170 to a piston 172 mounted in cylinder 173. The piston 172 has a pair of lands 174 on either side of relieved area 176 with its end opposite the rod assembly 170 connected to a plunger 178 which is loaded by a spring 179 to urge the piston 172 and its connected diaphragm 166 into a normal position at the right-hand side of cylinder 173 and chamber 168. In the normal position shown in FIG. 2, a conduit 180 joins the relieved area 114 about piston 110 in the rack piston control valve 104 with the relieved area 176 about piston 172 of the boost limiter valve 164. This same relieved area 176 in cylinder 173 is connected via conduit 182 to the conduit 136 which communicates hydraulic fluid back to the crank case of engine 13. The left-hand land 174 of piston 172 closes an area which permits communication to drainage conduit 162 which connects, in turn, to the pump bypass valve 124.

Before describing the operation of the hydraulic circuit described in FIG. 2, it should be noted that FIG. 3 is substantially identical to FIG. 2 with the addition of an accumulator 184 located in supply conduit 78 which is a pressure vessel connected into the conduit 78 by a conduit 186. Located in the supply conduit 78 between the connection for conduit 186 and the T 76 is a check valve 188 which is arranged to permit the flow of high pressure hydraulic fluid from the high pressure pump 54 into the accumulator 184 while preventing a flow in the other direction back toward the pump 54.

In FIG. 2, there has been described a control system that includes two key elements including the rack position control valve 104 and the boost limiter control valve 164. These valves work in combination with the pump bypass valve 124 and the nozzle control valve 62. The accumulator 184 and check valve 188 are optional features which may be desirable in some engines, especially a diesel engine, but may not be necessary in other engines, such as a gasoline engine.

In operation, high pressure fluid from pump 54 is supplied to the nozzle control valve manifold 80. This pressure may build up and bleed through the apertures 90 in pistons 84 which will remain in a closed position due to springs 88. As the pressure builds to a level substantially equal to that of the pump input, it is relieved by pump bypass valve 124 by causing the plunger 146 in chamber 144 to move to the left to open the check valve 138 thus bleeding off some of the pressure that has built up within the piston cylinder 154 to permit the piston 156 of bypass valve 124 to open. This permits the high pressure pump 54 to recycle its high pressure fluid through conduit 122 to conduit 66 and back to the input side of the pump.

The control system is designed to provide four basic modes operations including: pump bypass, just described; power transfer; lugging; and accumulator charging. The bypass valve 124 will not work when the controller 58 is in either the power transfer or lugging mode. Further, the pump bypass, power transfer, and accumulator charging modes are on-off functions, while the lugging mode is a modulating function.

When acceleration of engine 13 is desired, the controller enters its power transfer mode which is initiated as the rack control valve 104 is opened by moving linkage 120 to the right. Obviously, the rack control valve can also be a throttle control valve in a gasoline engine. If fast acceleration is desired, the rapid movement of linkage 120 will force plunger 116 against the urging of spring 118 to rapidly expel the hydraulic fluid from within pressure chamber 106. As the orifice 132 is larger than orifice 128, the hydraulic fluid in chamber 106 will be forced through conduit 130 into chamber 134 of the pump bypass valve 124. This increased pressure will lock check valve 138 into a closed position to assure that all of the available fluid pressure from pump 54 is applied into the manifold chamber 80 of nozzle control valve 62.

At the same time, the rapid depression of rack control valve 104 causes the land 112 to go beyond conduit 65 to permit the relief of the pressure stored within the cylinders 89 of the individual nozzle control valves 83 through conduit 65, around the relief area 114 in rack control valve 104, through conduit 180, around the relief area 176 in booster limit valve 164, and then through conduit 182 into conduit 136 to return to the crank case. Relief of pressure in cylinders 89 will cause one or more valves 83 to open. In the embodiment shown, the three control valves open at three different pressure levels. If the conditions just described are present, the pressure of approximately 2000 psi on the hydraulic fluid, for example, in the manifold chamber 80 and relief of pressure in cylinders 89 will cause the opening of all three individual rack control valves 83. This will provide high pressure hydraulic fluid to the plurality of nozzles 82 directed toward the turbine wheel 52 for rapidly accelerating the turbine wheel 52 and the compressor wheel 14 attached thereto by shaft 24. The charge air thus supplied to the engine will assist in an efficient acceleration of the vehicle in which the engine is mounted.

Under other conditions, the rack control valve 104 may be depressed slowly to permit the land 112 to continue to close the conduit 65 until a predetermined percentage of the depression of linkage 120 has been reached, 75% for example. At this point, the land 112 opens conduit 65 to permit the drainage thereof and of cylinders 89, thus opening one or more of the individual nozzle control valves 83. Whether the engine has been accelerated rapidly through the fast depression of the rack control valve 104 or the slow depression thereof, the manifold 80 will be depleted of its high pressure hydraulic fluid and will then be supplied only by pump 54.

The increased density of the charge air created by acceleration of compressor wheel 14 is applied to the engine 13 and, through pressure control line 70, to the diaphragm chamber 168 of boost limit valve 164. This will cause the diaphragm 166 and its associated piston 172 to move to the left against the urging of spring 179 and pressure on the left-hand face of diaphragm 166 for partially or fully closing off conduit 180 thus permitting pressure within nozzle control valve 62 to build for slowing down or terminating the amount of hydraulic fluid applied via conduit 64 to nozzles 82. This causes the modulation of the lugging mode mentioned above.

If an operator of the vehicle were to continue to accelerate or the vehicle load dissipate, for example when the vehicle starts down hill, it is desirable to provide an override to prevent the operator's heavy foot from overloading the engine or transmission. This override is provided by the boost limiter valve 164. As the engine efficiency increases, the increased pressure provided by line 70 to diaphragm 166 will cause the diaphragm to move piston 172 to the left to fully close conduit 180. This prevents the relief of pressure from control line 65 to close nozzle control valve 62, no matter what the rack control valve 104 calls for, to terminate the flow of hydraulic fluid to turbine wheel 52. Thus, one important feature of the present invention is the ability of the booster limit valve 164 to override the rack control valve 104 at all times to prevent engine overload. A second override control of the boost limit valve 164 will be found when piston 172 moves further to the left to open drain conduit 162 for relieving pressure within the piston chamber 154 of pump bypass valve 124. This will cause the piston 156 to open due to the reduced pressure on its upper surfaces for permitting the high pressure fluid in supply conduit 56 to pass through the bypass valve 124 and back to the input side of the pump 54 via conduit 66. The opposite of the modulated override control is the lugging mode. That is, as the engine loads up, the reduced absolute pressure in the intake manifold 30 is communicated via pressure control line 70 to boost limiter valve 164 to move diaphragm 166, piston 172 and land 174 to the right. This closes drainage line 162 to increase pressure in cylinder 154, closing piston 156 and bypass valve 124 to make high pressure fluid available to drive turbine wheel 52 for increasing charge air to the engine.

Another feature of the present invention is the utilization of accumulator 184 seen in FIG. 3. In a diesel engine at idle speed, it is conceivable that approximately 50% of the output power from the engine 13 can go to drive the turbocharger 10. In a gasoline engine, this percentage is between 6 to 10% of the output power. An accumulator 184 reduces the need for engine power at idle speeds by storing high pressure hydraulic fluid which can be used at idle when the need of acceleration occurs. The accumulator 184 can also be used at cruising speeds. In the embodiment shown in FIG. 2, the control valve manifold 80 could be sized to provide some of the features of the accumulator 184. However, it is more desirable to use an accumulator as shown in FIG. 3. When the rack control valve 104 is forced into an open position by fast or slow depression, it will be seen that the pressure built up within the accumulator 184 in combination with the high pressure fluid provided from the pump 54 passes through conduit 60 into manifold 80 and through the nozzle valves 82. This added flow and pressurized hydraulic fluid substantially increases the efficiency of the three-wheel turbine 10. Thus, it will be seen that the power transfer mode combines the fluid flow of pump 54 and accumulator 184. Without such an accumulator, in some engine combinations, such as a diesel engine, it is possible to utilize too much of the idling power to run the three-wheel turbine. Further, the accumulator reduces the parasitic power losses and permits the high pressure pump 54 to be designed much smaller than if an accumulator were not used. Within the present invention, the arrangement described in FIGS. 2 and 3 permits the charging of accumulator 184 only when the bypass valve 124 is closed. The hydraulic circuit shown in FIGS. 2 and 3 can be arranged so that this occurs only when the engine 13 is operating in a no-load condition.

Referring now to FIGS. 4 and 5, an electrical control system which incorporates the features of the hydraulic system described with regard to FIGS. 2 and 3 will be described. In FIG. 4, the internal combustion engine 13 is connected in a manner similar to that described in FIG. 1 with the lubricating oil from the hydraulic system 36 supplied at a pressure of 40 to 80 psi, for example, via conduit 190 through, a pressure regulator 192 and the oil filter 42 whose order may be reversed to the high pressure pump 54. The pump is driven by a shaft 192 through a clutch 194 having a pulley 196 that, is driven by a suitable belt 198 and drive pulley, gear train or chain drive, 200 driven, in turn, by the engine 13. Fluid from the high pressure pump 54 is connected via conduit 56 to the three-wheel turbocharger 10 and the nozzles 82 which drive the hydraulic turbine wheel 52, not shown. After the high pressure fluid has been utilized to drive the hydraulic wheel 52, it is passed through the check valve 74, which can be on the input side of the turbocharger 10, where it may be utilized to lubricate the turbocharger bearings 22 via conduit 202 before being returned to the engine reservoir 38. Alternately, the hydraulic fluid from check valve 74 may be passed through a second conduit 204 to the supply side of the high pressure pump 54.

In the embodiment shown in FIG. 4, the controller is a engine management circuit 206 which may be used to organize the operating parameters 68 for turning on or off the clutch 194 and driving pump 54. These output parameters 68 may include: throttle or rack position provided by a throttle/rack position indicator 208, the RPM of the engine 13 provided by an RPM indicator 210, and the manifold absolute pressure provided by a manifold absolute pressure indicator 212. Another parameter 68, not shown, includes engine airflow, either mass or volume flow, which may be provided by a suitable airflow meter, not shown. The indicator for throttle or rack position 208 may be a slide wire which generates an analog signal for use by engine management circuit 206. The RPM indicator may be a tachometer which also generates an analog signal for application to the circuit 206, while the absolute pressure from the manifold may be supplied by either an analog or digital pressure gauge. Obviously, the analog signals from indicators 208 and 210 and 212 may also be in a digital form.

As in the hydraulic circuits described in FIGS. 2 and 3, the most important operating parameters to be utilized by the engine management circuit 206 are the engine RPM throttle or rack position and manifold absolute pressure or airflow. Here again, it is important to utilize the signal from the manifold absolute pressure indicator to override the signal from the throttle or rack position indicator. Next, when the throttle indicator shows a sudden change, usually an increased signal representing acceleration, the engine management circuit 206 should energize the clutch 194 to apply high pressure hydraulic fluid to the turbocharger 10 to carry out the power transfer mode of the controller 206. Lugging can also be controlled by signals from the manifold absolute pressure indicator 212. The operation of pump bypass is simply carried out by turning off the pump 54 in the embodiment of FIG. 4.

Referring now to FIG. 5, a second embodiment of the circuitry shown in FIG. 4 is described with the engine 13 driving the belt 198 or chain or gear via drive pulley 200 or chain or gear drive to turn pulley 196 on the high pressure pump 54. In the embodiment shown, the clutch 194 has been eliminated. However, an accumulator 184 has optionally been placed in the supply conduit 56 which is connected to an proportional valve 214 or an ON/OFF valve. The proportional valve 214 or the ON/OFF valve may function to provide 100% of the high pressure fluid supplied via supply line 56 to the turbocharger 10 and its nozzles 82 which drive the hydraulic turbine wheel 52. When less than 100% of the hydraulic fluid is being provided to the turbocharger 10, the remaining portion is routed over a return conduit 215 through an optional oil cooler 216 to the conduit 204 and then back to the supply side of pump 54. The proportional valve 214 may be controlled by a simple engine management controller circuit or, in the embodiment shown in FIG. 5, by an engine management computer controller 218 (EMC) which receives several operating parameters 68 including signals representing throttle or rack position 208, engine RPM 210, or the manifold absolute pressure 212 or airflow.

In operation, the computer 218 controls the setting of the proportional valve in a manner similar to the described hereinabove with regard to the hydraulic circuits of FIGS. 2 and 3 or the electric circuit of FIG. 4. When the throttle indicator 208 is placed in an accelerated position, or senses a rapid change, the computer 218 might open the proportional valve or ON/OFF valve so that 100% or less of the flow from pump 54 and accumulator 184 is passed through the proportional valve 214 to the turbocharger 10 to carry out the power transfer operational function. Again, it is important to override the throttle position indicator 208 if the manifold absolute pressure indicator 212 shows that the engine 13 is being overloaded. Under these circumstances, the proportional valve or ON/OFF valve will be closed substantially to divert the high pressure fluid from line 56 via line 215 through the cooler 216 and conduit 204 to the supply side of pump 54. This accomplishes the overload prevention function. The pump bypass mode is accomplished by moving the proportional valve or ON/OFF valve so that 0% of flow goes to the turbocharger 10 and 100% of flow returns to pump input.

The configuration shown in FIG. 5 lends itself to many modifications. As described above with regard to FIGS. 2 and 3, various numbers and combinations of nozzles 82 may be utilized. If a clutch driven pump is not used, the pump 54 may be geared at any appropriate speed proportional to the engine speed. Further, the pump 54 may be either a fixed displacement pump, variable volume, flow limited pump or a variable pressure, flow limited pump. As discussed, an accumulator may or may not be used. Further, it is not necessary to use a computer, as shown in FIG. 5; but, a simple on-off type of circuit may be designed utilizing relay switching or the like. When a computer is used, the computer may either be a separate computer designed exclusively for the turbocharger 10 or the engine management computer (EMC) of the vehicle in which the turbocharger 10 is used. The pump 54 may be a pump dedicated to the three-wheel turbocharger 10 or the pump may be used for other engine or vehicle functions such as: active suspension, power steering, or power brakes.

While variations of the present invention will become apparent to those skilled in the art, the present invention should be limited only by the appended claims.

We claim:
1. In a three-wheel turbocharger for use with an internal combustion engine having a shaft that rotatably supports a turbine wheel for exhaust gas, a compressor wheel for input air, and a third turbine wheel for hydraulic fluid, wherein the improvement comprises:
a controller for controlling the flow of hydraulic fluid to said third wheel of said three-wheel turbocharger by receiving a plurality of operating pa- rameters relating to the conditions of said internal combustion engine;

adjustable position means for accelerating the revolutions per minute of said engine;

means for applying an indication of the position of said adjustable position means and of the revolutions per minute of said engine as two of said plurality of operating parameters to said controller;

pressure sensitive means for sensing the load on said engine;

means for applying an indication of the pressure at said pressure sensitive means as another of said plurality of operating parameters to said controller; and said controller including means for overriding said adjustable position means for accelerating said engine when said pressure sensitive means for sensing the load on said engine indicate said load is decreasing.

2. The turbocharger of claim 1, wherein:
said controller is a hydraulic controller.

3. The turbocharger of claim 1, wherein:
said controller is an electronic controller.

4. The turbocharger of claim 3, wherein:
said electronic controller is a computer.

5. The turbocharger of claim 4, wherein:
said computer is integrated with an engine management computer for the vehicle in which the engine is mounted.

6. The turbocharger of claim 1, wherein:
said engine is a diesel engine and said adjustable position means for accelerating said engine is a rack control valve.

7. The turbocharger of claim 1, wherein:
said engine is a gasoline engine and said adjustable position means for accelerating said engine is a throttle.

8. The turbocharger of claim 1, wherein:
said pressure sensitive means for sensing the load on said engine is a boost limiter valve having a pressure sensitive diaphragm connected to sense the absolute pressure of the charge air supplied to said engine by said turbocharger.

9. The turbocharger of claim 1, additionally comprising:
a high pressure pump having an input and an output;
an accumulator connected to said pump output to receive said hydraulic fluid which drives said third turbine wheel; and
a valve for supplying said hydraulic fluid to said third turbine wheel and in the alternative, back to said input of said high pressure pump.

10. The turbocharger of claim 9, wherein:
said controller is a hydraulic controller;
said valve is a bypass valve connected to pass said hydraulic fluid back to said input of said pump;
said controller includes means for applying said hydraulic fluid in said accumulator to said third turbine wheel when said adjustable position means for accelerating said engine is actuated; and
said controller further includes means for locking said bypass valve closed when said adjustable position means for accelerating said engine is actuated for applying said hydraulic fluid from said high pressure pump and said accumulator to said third hydraulic wheel.

11. The turbocharger of claim 9, wherein:
said controller is an electrical controller;
said valve is a proportional valve connected to pass said hydraulic fluid back to said input of said pump and to said third turbine wheel;
said controller including means for adjusting the setting of said proportional valve in response to said adjustable position means for accelerating said engine and said pressure sensitive means for sensing the load on said engine.

12. The turbocharger of claim 1, wherein:
said adjustable position means for accelerating the revolutions per minute of said engine further includes an on-off control function in said controller; and
said pressure sensitive means for sensing the load on said engine further includes a modulating control function in said controller.

13. The turbocharger of claim 1, wherein:
said third turbine wheel is driven by a plurality of nozzles for directing said hydraulic fluid onto said third wheel.

14. The turbocharger of claim 13, wherein:
said plurality of nozzles include two or more spring loaded nozzles each actuated by a different pressure of said hydraulic fluid.

15. In a three-wheel turbocharger having a shaft that rotatably supports a turbine wheel for exhaust gas, a compressor wheel for input air, and a third turbine wheel for hydraulic fluid wherein the improvement comprises:
a pump having an input and an output for supplying hydraulic fluid to said third wheel;
an accumulator connected to receive said hydraulic fluid from said output of said pump;
a proportioning valve connected to receive said hydraulic fluid from said output of said pump and from said accumulator;
an electronic controller connected to said proportioning valve;
said proportioning valve connected to supply said hydraulic fluid to said third turbine wheel and to said input of said pump in response to signals from said electronic controller; and
said proportioning valve connected to a plurality of nozzles for directing said hydraulic fluid onto said third turbine wheel.

16. The turbocharger of claim 15, wherein:
said pump is a variable volume pump.

17. The turbocharger of claim 15, wherein said electronic controller is integrated with an engine management computer for the vehicle in which the turbo charger is mounted.

18. The turbocharger of claim 15, wherein:
said plurality of nozzles include two or more spring loaded nozzles, each activated by a different pressure of said hydraulic fluid.

19. A controller for a three-wheel turbocharger that is used to supply high pressure hydraulic fluid to said third wheel to accelerate said turbocharger and increase the density of charge air supplied to an engine, comprising:
adjustable position means for accelerating the revolutions per minute of said engine and for applying an indication of said adjustable position to said controller;
pressure sensitive means for sensing the load of said engine and for applying an indication of said pressure to said controller;

an accumulator for said hydraulic fluid that retains said fluid under said high pressure and releases said high pressure fluid to said third wheel when said adjustable position means for accelerating said engine are activated; and means for overriding said adjustable position means for accelerating said engine and said release of high pressure when said pressure sensitive means for sensing the load on said engine indicate said load is decreasing.

20. The controller of claim 19, wherein:
said adjustable position means for accelerating said engine includes an on-off control provided by said controller; and
said means for overriding said adjustable position means for accelerating said engine is a modulated control provided by said controller.

21. The controller of claim 19, additionally comprising:
a bypass valve for passing said high pressure fluid around said three-wheel turbine when said adjustable position means for accelerating said engine is indicating the absence of acceleration or when said pressure sensitive means for sensing the load on said engine is indicating the absence of a load.

22. The controller of claim 21, additionally comprising:
said adjustable position means for accelerating said engine include means for locking said bypass valve closed to prevent said high pressure fluid from passing therethrough during acceleration.

23. The controller of claim 19, wherein:
said controller is a hydraulic controller.

24. The controller of claim 19, wherein:
said controller is an electronic controller.

25. The controller of claim 24, wherein:
said electronic controller is a computer.

26. The controller of claim 25, wherein:
said computer is integrated with an engine management computer for the vehicle in which the engine is mounted.

27. The controller of claim 19, wherein:
said engine is a diesel engine and said adjustable position means for accelerating said engine is a rack control valve.

28. The controller of claim 19, wherein:
said engine is a gasoline engine and said adjustable position means for accelerating said engine is a throttle.

29. The controller of claim 19, wherein:
said pressure sensitive means for sensing the load on said engine is a boost limiter valve having a pressure sensitive diaphragm connected to sense the absolute pressure of the charge air supplied to said engine by said turbocharger.

* * * * *